(12) United States Patent
Wolff et al.

(10) Patent No.: US 7,598,192 B2
(45) Date of Patent: Oct. 6, 2009

(54) OPTICAL GLASS

(75) Inventors: Silke Wolff, Hueckeswagen (DE);
Goran Sabljic, Mainz (DE); Ute Woelfel, Mainz-Laubenheim (DE)

(73) Assignee: Schott AG, Mainz (DE)

( * ) Notice: Subject to any disclaimer, the term of this patent is extended or adjusted under 35 U.S.C. 154(b) by 139 days.

(21) Appl. No.: 11/608,620

(22) Filed: Dec. 8, 2006

(65) Prior Publication Data

US 2007/0149381 A1 Jun. 28, 2007

(30) Foreign Application Priority Data

| Dec. 23, 2005 | (DE) | .................. 10 2005 062 640 |
| Sep. 23, 2006 | (DE) | .................. 10 2006 045 025 |
| Nov. 9, 2006 | (DE) | .................. 10 2006 052 787 |

(51) Int. Cl.

| C03C 3/064 | (2006.01) |
| C03C 3/062 | (2006.01) |
| C03C 3/066 | (2006.01) |
| C03C 3/097 | (2006.01) |
| C03B 7/00 | (2006.01) |
| C03B 9/16 | (2006.01) |
| C03B 9/20 | (2006.01) |

(52) U.S. Cl. .................. 501/77; 501/73; 501/79; 501/63; 55/226

(58) Field of Classification Search .................. 501/73, 501/77, 79, 63, 65–70, 72, 78
See application file for complete search history.

(56) References Cited

U.S. PATENT DOCUMENTS

| 4,084,978 | A | * | 4/1978 | Sagara | .................. 501/63 |
| 4,128,342 | A | | 12/1978 | Renk | |
| 4,612,295 | A | | 9/1986 | Sagara | |
| 4,742,028 | A | * | 5/1988 | Boudot et al. | .................. 501/78 |
| 4,996,173 | A | * | 2/1991 | Tachiwana | .................. 501/73 |
| 5,952,256 | A | * | 9/1999 | Morishita et al. | .................. 501/63 |
| 6,413,894 | B1 | | 7/2002 | Sato | |

FOREIGN PATENT DOCUMENTS

| DE | 26 55 857 | 6/1977 |
| DE | 28 20 940 | 11/1978 |
| DE | 34 20 306 | 1/1985 |
| DE | 199 19 802 | 11/1999 |
| FR | 2 334 640 | 7/1977 |
| FR | 2 549 033 | 1/1985 |
| GB | 1 553 560 | 9/1979 |
| GB | 1 557 880 | 12/1979 |
| GB | 2 145 407 | 3/1985 |
| JP | 52-69915 | 6/1977 |
| JP | 53-142423 | 12/1978 |
| JP | 58-46459 | 3/1983 |
| JP | 60021828 | 2/1985 |
| JP | 60-221338 | 11/1985 |
| JP | 64-7012 | 2/1989 |
| JP | 52-45612 | 9/1993 |

* cited by examiner

*Primary Examiner*—Karl E Group
*Assistant Examiner*—Noah S Wiese
(74) *Attorney, Agent, or Firm*—Michael J. Striker

(57) ABSTRACT

The invention relates to optical glasses intended for the application fields of imaging, sensors, microscopy, medical technology, digital projection, photolithography, laser technology, wafer/chip technology, and for telecommunication, optical communication engineering and optics/lighting in the automotive sector, having a refractive index of $1.60 \leq n_d \leq 1.80$ and/or an Abbe number of $30 \leq v_d \leq 40$ with a pronounced short flint character, good chemical stability, excellent crystallization stability, good solarization stability and the following composition (in wt. % based on oxide):

| $SiO_2$ | 19-45 |
| $B_2O_3$ | 3-7.5 |
| $Nb_2O_5$ | 25-31 |
| $K_2O$ | 2-8 |
| $TiO_2$ | 0.1-2 |
| $ZrO_2$ | 6-10 |
| $Ta_2O_5$ | 0.5-8. |

39 Claims, No Drawings

OPTICAL GLASS

The present invention relates to an optical glass, the use of such a glass, optical elements or preforms of such optical elements and optical parts or optical components comprising such optical elements.

BACKGROUND OF THE INVENTION

Conventional optical glasses with the optical properties claimed here (heavy flint and extreme barium heavy flint properties) for the application fields of imaging, sensors, microscopy, medical technology, digital projection, photolithography, laser technology, wafer/chip technology, and for telecommunication, optical communication engineering and optics/lighting in the automotive sector, generally contain PbO in order to achieve the desired optical properties, i.e. a refractive index $n_d$ of $1.60 \leq n_d \leq 1.80$ and/or an Abbe number $v_d$ of $30 \leq v_d \leq 40$. PbO is also frequently used to adjust a pronounced short flint character. This makes these glasses less chemically stable. $As_2O_3$ is often used as a refining agent in this case. Since the glass components PbO and $As_2O_3$ have been regarded as environmentally unfriendly for some years, most manufacturers of optical instruments and products tend to use lead- and arsenic-free glasses in preference. For use in high price range products, glasses with increased chemical stability are also constantly gaining importance.

Known lead-free glasses with these optical properties are generally based on using $TiO_2$ in a silicate matrix, which leads to glasses which on the one hand are susceptible to crystallization and therefore often not workable in a secondary hot forming step, and on the other hand very difficult to process mechanically owing to high hardness.

In high-quality optical systems, the correction of chromatic aberration is already an important topic from the design of the system onwards. For excellent chromatic aberration correction, glasses with a pronounced short flint character are indispensable. These are glasses whose relative partial dispersion differs from the normal grades and which are therefore particularly suitable for correcting chromatic aberration. This optical property is often due to the use of PbO, however, which is ruled out for the aforementioned ecological reasons.

Instead of the hitherto customary machining of optical components from glass in block or ingot form, production methods in which direct pressings, i.e. blank-pressed or precise pressed optical components and/or preforms for re-pressing which are as close as possible to the final contour, so-called "precision gobs", can be obtained directly at the end of melting the glass have recently been gaining importance both for the consumer market and for the high-quality sector. "Precision gobs" generally means preferably fully fire-polished, semifree- or free-formed glass portions, which can be obtained via various production methods. For this reason the need for "short" glasses, i.e. for glasses whose viscosity changes very strongly with temperature, has been reported more and more in the context of melting and hot forming process technology. This method has the advantage that it is possible to reduce the hot forming times, and therefore the mould closure times, in precision hot forming close to final geometry. In this way on the one hand the throughput and therefore the time yield can be increased, and on the other hand the mould material is thereby spared, which has a very positive effect on the overall production costs. Furthermore, owing to the faster solidification of short glasses, it is also possible to work glasses with a stronger susceptibility to crystallization, and pre-nucleation, which could be problematic in later secondary hot forming steps, is avoided or at least drastically reduced. For the same reason, there is likewise a need for glasses whose temperature-viscosity profile in absolute terms comprises low temperatures in the hot forming range. Through lower process temperatures, this also contributes to increased mould lifetimes and, through fast stress-free cooling, to low pre-nucleation rates. This also offers a greater range of potentially more cost-effective mould materials, which is significant particularly in precision hot forming close to final geometry.

In modern high-performance optics, ever-greater requirements are also being placed on the imaging accuracy and resolution. This means that on the one hand ever-larger imaging and projection surfaces are being achieved, but on the other hand the structures to be imaged must be ever-smaller and imaged ever-more accurately in respect of point and detail. For this reason it is necessary to illuminate with ever-shorter wavelengths, i.e. with high-energy light, which increases the energy load on the optical elements. In a multiplicity of technical applications, for example microlithography, ever-shorter exposure times are furthermore required in order to increase the production rate, so that the radiation power or beam density which is fed through the optics, i.e. the radiation load per unit time, must necessarily increase. In optical systems, particularly in communications engineering and telecommunications, it is furthermore desirable to obtain a high luminous efficiency, i.e. a high transmission.

This places great demands not only on the development of the respective optics, but also on the glass used for the optics. For example, it is known that the use of high energy densities leads to a phenomenon referred to as solarization, i.e. a radiation-induced modification of the internal structure of the glass, which drastically reduces the transmission i.e. the radiation transparency of an optical element. Glasses which have a high stability against solarization are therefore needed.

The prior art relevant to the invention is summarized in the following documents:
  JP 60-221 338 Ohara
  DE 3 420 306 Hoya
  DE 2 655 857 Hoya
  JP 52-045 612 Sumita According thereto, it is possible to produce glasses with similar optical properties or comparable chemical composition, although they show significant disadvantages in direct comparison with the glasses according to the invention:

JP 60-221 338 describes lanthanum borate glasses. Here $La_2O_3$, which intrinsically absorbs at the blue spectral edge, is used to achieve the desired refractive index properties. Besides the strong susceptibility to crystallization inherent in this glass family, these glasses therefore have a significantly reduced transmission in the blue spectral range relative to $La_2O_3$-free glasses.

DE 3 420 306 describes niobium silicates containing high levels of alkaline-earth metal oxides, whose network is destabilized by the high alkaline-earth metal oxide content, here especially CaO at 8 to 42 wt. % and (CaO+MgO) at 16 to 42 wt. %. This leads to strong repercussions on the viscosity-temperature profile, and therefore to glasses which are too short for hot forming close to final geometry and/or secondary hot forming. Furthermore, in order to achieve the high refractive index properties despite large amounts of low-index alkaline-earth metal oxides, larger amounts of high-index but nucleating components have to be tolerated.

DE 2 655 857 likewise discloses niobium silicates, but with different optical properties (lower refractive index and dispersion). High alkaline-earth metal oxide contents (e.g. CaO 5-35 wt. %) can therefore be tolerated without having to use larger amounts of high-index but nucleating components in order to maintain the refractive index.

JP 58-045 612 describes niobium silicates optionally containing up to at most 5 wt. % boron oxide. These low contents do not exhibit the stabilizing effect against crystallization, which is needed for hot forming close to final geometry and/or secondary hot forming, in the niobium silicate glass system destabilized by high levels of high-index components.

It is therefore an object of the present invention to provide an optical glass in a composition range with which the desired optical properties are made possible even without using PbO because of ecological considerations, and as far as possible also without $As_2O_3$, $Bi_2O_3$ and $La_2O_3$, with a reduced $TiO_2$ content. Together with a pronounced short flint character, these glasses should have excellent crystallization stability. These glasses should as far as possible be workable via a precise pressing method and have low transition temperatures $T_g$. They should furthermore be readily meltable and workable, and have a sufficient crystallization stability which permits manufacture in continuously run plant. A glass which is as short as possible in a viscosity range of $10^{7.6}$ to $10^{13}$ dPas is furthermore desirable. They should be suitable for use in the application fields of imaging, sensors, microscopy, medical technology, digital projection, photolithography, laser technology, wafer/chip technology, and for telecommunication, optical communication engineering and optics/lighting in the automotive sector.

SUMMARY OF THE INVENTION

According to a first aspect of the invention, an optical glass is provided which comprises the following composition (in wt. % based on oxide):

| | |
|---|---|
| $SiO_2$ | 19-45 |
| $B_2O_3$ | 3-7.5 |
| $Nb_2O_5$ | 25-31 |
| $K_2O$ | 2-8 |
| $TiO_2$ | 0.1-2 |
| $ZrO_2$ | 6-10 |
| $Ta_2O_5$ | 0.5-8 |

According to a second aspect, optical elements are provided which comprise the glass according to the invention. Optical elements may in this case particularly be lenses, prisms, light guide rods, arrays, optical fibres, gradient components, optical windows and compact components. According to the invention, the term "optical element" also includes preforms of such an optical element, for example gobs, precision gobs and the like.

A third aspect of the invention relates to a method for producing an optical element, comprising the step of:

precise pressing an optical glass according to the invention.

A fourth aspect of the invention relates to the use of such an element for producing optical parts or optical components, for example sensors, microscopy, medical technology, digital protection, telecommunication, optical communications engineering/information transmission, optics/lighting in the automotive sector, photolithography, steppers, excimer lasers, wafers, computer chips and/or integrated circuits and electronic devices which contain such circuits and chips.

A fifth aspect of the invention relates to optical parts or optical components, for example for imaging sensors, microscopy, medical technology, digital protection, telecommunication, optical communications engineering/information transmission, optics/lighting in the automotive sector, photolithography, steppers, excimer lasers, wafers, computer chips and/or integrated circuits and electronic devices which contain such circuits and chips.

DETAILED DESCRIPTION OF THE PREFERRED EMBODIMENTS

The glasses according to the invention have optical properties in common with known optical glasses with these properties. However, they are also distinguished by a pronounced short flint character, better chemical stability and processability, lower production costs due to reduced raw material and process costs, sufficient crystallization stability due to their shortness, good solarization stability, as well as by good meltability and workability. Using the glasses according to the invention, an adjustment of crystallization stability and viscosity-temperature profile has been achieved such that further heat treatment of the glasses is readily possible (for example by pressing or re-pressing).

The glasses according to the invention preferably have a refractive index $n_d$ of $1.60 \leq n_d \leq 1.80$ and/or an Abbe number $v_d$ of $30 \leq v_d \leq 40$; a refractive index $n_d$ of $1.65 \leq n_d \leq 1.75$ and/or an Abbe number $v_d$ of $33 \leq v_d \leq 38$ are more preferred.

According to one embodiment, the glasses according to the invention are as "short" as possible in a viscosity range of $10^{7.6}$ to $10^{13}$ dPas. In this context, "short glasses" is intended to mean glasses whose viscosity varies strongly with a relatively minor temperature change in a particular viscosity range The temperature interval $\Delta T$, in which the viscosity of this glass decreases from $10^{7.6}$ to $10^{13}$ dPas, is preferably at most 100 K.

In what follows, the expression "X-free" or "free of a component X" means that the glass essentially does not contain this component X, i.e. such a component is present at most as an impurity in the glass but is not added to the glass composition as an individual component. X stands for any component, for example $Li_2O$.

The basic glass system is the niobium silicate glass system in which the $Nb_2O_5$, embedded in the slightly $B_2O_3$-containing silicate network, primarily serves to adjust the claimed optical properties. To this end, 25-31 wt. %, preferably at most 30 wt. %, more preferably at most 29 wt. % $Nb_2O_5$ are used. A minimum level of 26 wt. % $Nb_2O_5$ is likewise preferred. With lower contents, the moderately high refractive index could not be achieved with a low Abbe number. Owing to the nucleating character of $Nb_2O_5$, higher contents would cause glasses susceptible to crystallization whose narrow process window entails low yields in the melting process or secondary hot forming processes.

The silicate network, into which the $Nb_2O_5$ is bound, is based on 19-45 wt. %, preferably at least 24 wt. %, more preferably at least 28 wt. % $SiO_2$. The level of $SiO_2$, however, is preferably restricted to at most 40 wt. %, more preferably at most 36 wt. %. Lower $SiO_2$ contents would lead to an unstable network and therefore devitrification or at least glasses susceptible to crystallization. Higher $SiO_2$ contents would lead to glasses which are too "long", i.e. glasses whose viscosity varies only slowly with an increasing or decreasing temperature. Furthermore, highly $SiO_2$-containing glasses are mostly high-melting. These two properties are prohibited for glasses which are intended to be worked in hot forming processes close to final geometry.

For this reason, the network destabilized by large amounts of high refractive index substances is stabilized by the second network former $B_2O_3$, which produces neither "long" nor high-melting glasses owing to its properties similar to a fluxing agent. In this case, 3-7.5 wt. % $B_2O_3$ are used, preferably at least 5 wt. %; particularly preferred embodiments have $B_2O_3$ contents of from 5 to 6 wt. %. Lower contents do not show the required stabilizing effect, whereas higher contents can lead to an increased crystallization susceptibility of the glasses according to the invention by increasing the ion mobility.

Besides $Nb_2O_5$, the high-index components $ZrO_2$ in a proportion of 6-10 wt. %, preferably at least 7 wt. % and/or at most 9 wt. %, and $Ta_2O_5$ in a proportion of 0.5-8 wt. %, preferably at least 0.5 wt. % and/or at most 6 wt. %, are also used in order to adjust the desired optical properties in the glasses according to the invention. This makes it possible to use the low quantities of $Nb_2O_5$ according to the invention, exceeding which would cause an enhanced crystallization susceptibility of the glasses. Furthermore, in contrast to $Nb_2O_5$, both components are free of intrinsic absorptions at the blue spectral edge of optical glasses, so that a transmission improvement relative to a glass with a higher $Nb_2O_5$ content can be achieved by this distribution of the required amounts of high-index components in favour of $ZrO_2$ and $Ta_2O_5$. Furthermore, $ZrO_2$ and particularly $Ta_2O_5$ promote a wavelength-dependent refractive index profile (dispersion), which leads to the pronounced short flint character.

Because of the nucleating character of the components $Nb_2O_5$, $ZrO_2$ and $Ta_2O_5$, their total content should however not exceed preferably 47 wt. %, more preferably 45 wt. %.

$TiO_2$ also has a refractive index increasing and therefore nucleating effect, like $ZrO_2$ and $Ta_2O_5$. Furthermore, a $TiO_2$ content higher than as claimed would enhance the dispersion of the glasses beyond the intended range and deteriorate their transmission at the blue spectral edge. The glass composition according to the invention therefore contains $TiO_2$ in a proportion of 0.1-2 wt. %, preferably at most 0.5 wt. %, more preferably at most 0.45 wt. %. It is, however, necessary to add $TiO_2$ since it stabilizes the glass against long-term radiation damage i.e. solarization.

$K_2O$ is used at a level of 2-8 wt. %, preferably at most 6 wt. %, more preferably at least 2.5 wt. % and/or at most 4.5 wt. %, for flexible fine-adjustment of both the optical properties and the temperature-viscosity profile in favour of hot forming close to final geometry. Lower proportions would not give the desired effect, whereas higher contents lead to an excessively strong tendency towards low refractive indices and/or "long" glasses.

Owing to their properties as fluxing agents, the lower alkali metal oxides $Li_2O$ (at most 8 wt. %, preferably at least 1 wt. %, more preferably at least 3 wt. % and/or at most 8 wt. %, more preferably at most 6 wt. %) and $Na_2O$ (at most 10 wt. %, preferably at least 2 wt. %, more preferably at least 5 wt. % and/or at most 10 wt. %, more preferably at most 8 wt. %) are intended for application-specific separate adaptations, for example ion exchangeability (besides the optional $Ag_2O$ component of at most 5 wt. %) and minor variations of the viscosity-temperature profile.

Nevertheless, the total content of alkali metal oxides according to preferred embodiments of the glasses according to the invention should not exceed 20 wt. %, more preferably 18 wt. %, particularly preferably 16 wt. %. Higher contents would lead to an unacceptably strong tendency towards low refractive indices and/or "long" glasses. Increased lithium contents furthermore lead to enhanced aggressivity of the glass in respect of the refractory material when melting. Besides shorter equipment lifetimes, this leads to a strong ingress of the refractory material into the glass. In the case of platinum this leads to transmission losses at the blue spectral edge, in the case of ceramic materials to enhanced crystallization susceptibility in melts as well as both primary and secondary hot forming (for example re-pressing) by ingress of heterogeneous crystallization nuclei.

For the purpose of fine-adjusting the viscosity-temperature profile, the glasses according to the invention may preferably have a content of at most 18 wt. %, preferably at most 12 wt. % of components MO in the group MgO, CaO, SrO, BaO, ZnO. Each one of the components may in this case comprise individual contents of at most 8 wt. %, preferably at most 5 wt. %. Other preferred embodiments are free of MgO and/or SrO. For CaO more preferably at most less than 5 wt. %, most preferably at most 4 wt. % and/or at least 2 wt. % are preferred, for BaO more preferably at least 0.1 and/or at most 2 wt. % are preferred and for ZnO more preferably likewise at least 0.1 and/or at most 2 wt. % are preferred. Besides excessive repercussions on the viscosity-temperature profile (glasses which are too short), exceeding these upper limits would lead to a significant reduction of the refractive index with an elevated Abbe number and therefore outside the optical property range favoured here. MgO and SrO are furthermore components whose raw materials are less readily available in the quantities required for high-quality optics, and are therefore more cost-intensive than other alkaline-earth metal oxides. Obviating further representatives of these components MO, i.e. focusing on one of the components, would however restrict the variability of the viscosity-temperature profile, likewise going below the said lower limits would show a negative effect on this.

For more flexible adjustment of a special point inside the achievable optical property range; the glasses according to the invention may additionally contain oxides in the group $P_2O_5$, $Y_2O_3$, $Gd_2O_3$, $GeO_2$, $Yb_2O_5$, $WO_3$ or F in a total content of at most 5 wt. %. Increasing the total content of group F, $P_2O_5$, $Y_2O_3$, $Gd_2O_3$, $GeO_2$, $Yb_2O_5$, $WO_3$ and/or the silver oxide content respectively beyond 5 wt. % would, besides losses in the transmission (due to $Ag_2O$, $Y_2O_3$, $Gd_2O_3$, $Yb_2O_5$, $WO_3$), lead to an increased devitrification susceptibility (due to $Y_2O_3$, $Gd_2O_3$, $Yb_2O_5$) and/or undesired "length" of the glass (due to $GeO_2$) and/or handling and work protection problems in batch preparation and the melting process (due to F, $P_2O_5$)

The glass according to the invention is preferably free of $La_2O_3$. $La_2O_3$ has an intrinsic absorption in the blue wavelength range, and the transmission edge (wavelength of 50% transmission value) of $La_2O_3$-containing glasses is thus shifted unacceptably far towards longer wavelengths. Lanthanum oxide furthermore increases the crystallization susceptibility of optical glasses very greatly. For the same reasons the glasses according to the invention are preferably free of $Bi_2O_3$, which can furthermore lead to strong discolorations in the glass by its weakness to the redox conditions in the melting process. The process windows of such glasses are extremely narrow, and therefore uneconomical for conventional optical glasses.

According to most embodiments, the glass according to the invention preferably contains no aluminium oxide. According to a particular embodiment of the present invention, however, the glass is also suitable for ion exchange processes. According to this embodiment, it is preferable for the glass to contain $Al_2O_3$. A low $Al_2O_3$ component of at most 6 wt. % promotes the formation of a structure in the material, which is also conducive to ion exchange by increasing the ion mobility. Increasing the $Al_2O_3$ content beyond 6 wt. %, however, would lead to increased devitrification susceptibility and undesired "length" of the glass, and is therefore not preferred. A glass according to this embodiment may also contain silver oxide in a proportion of 5 wt. %, preferably 2 wt. %. Increasing the silver oxide content beyond 5 wt. %, however, would lead to losses in the transmission of the glass.

As an optical glass, the glass according to the invention is preferably also free of colouring and/or optically active e.g. laser-active components.

According to another embodiment of the present invention as a base glass of an optical filter or solid-state laser, the glass according to the invention may contain colouring and/or optically active e.g. laser-active components in contents of up to at most 5 wt. %, these quantities being added further to the components of the remaining glass composition giving 100 wt. %.

According to one embodiment of the present invention, preferably at least 90 wt. %, more preferably at least 95 wt. % of the glass according to the invention consists of the aforementioned components.

According to a further embodiment of the present invention, the glass according to the invention is also preferably free of other components not mentioned above, i.e. according to such an embodiment the glass consists essentially of the aforementioned components. The expression "essentially consists of" in this case means that other components are present at most as impurities, but are not deliberately added to the glass composition as individual components.

The glass according to the invention may contain conventional refining agents in small amounts. The sum of the refining agents added is preferably at most 2.0 wt. %, more preferably at most 1.0 wt. %, these quantities being added further to the components of the remaining glass composition giving 100 wt. %. The glass according to the invention may contain at least one of the following components as a refining agent (in wt. % additionally to the remaining glass composition):

| | |
|---|---|
| $Sb_2O_3$ | 0-1 and/or |
| SnO | 0-1 and/or |
| $SO_4^{2-}$ | 0-1 and/or |
| NaCl | 0-1 and/or |
| $As_2O_3$ | 0-0.1 and/or |
| $F^-$ | 0-1 |

All glasses according to the invention furthermore have a good chemical stability and stability against crystallization, i.e. crystallization stability. They are furthermore distinguished by good meltability and flexible workability close to final geometry, low production costs due to reduced process costs, good ion exchange properties, good solarization stability and good environmental friendliness.

The glasses according to the invention have a Tg of less than or equal to 640° C., are crystallization-stable and can be worked well.

The glasses according to the invention have negative anomalous relative partial dispersions of at most $-50*10^{-3}$ on measurement samples from cooling with a cooling rate of about 7K/h.

The glasses according to the invention have thermal expansion coefficients α of less than or equal to $10.5*10^{-7}$/K. This avoids problems with thermal stress in further working and assembly technology.

The glasses according to the invention have specific densities of less than or equal to 3.6 g/cm³. Owing to their low inert mass or matter (German "traege Masse") as considered relative to lead-containing pendants, the optical elements and/or optical components made from them are particularly suitable for mobile/portable units.

Using the glasses according to the invention, an adjustment of optical properties, viscosity-temperature profile and working temperatures has been achieved such that highly specified hot forming close to final geometry is ensured even with sensitive precision machines. A correlation of crystallization stability and viscosity-temperature profile has furthermore been achieved so that further thermal processing of the glasses is readily possible, for instance pressing or re-pressing, or ion exchange processes.

The invention furthermore relates to a method of using the glasses according to the invention for the application fields of imaging, sensors, microscopy, medical technology, digital protection, telecommunication, optical communications engineering/information transmission, optics/lighting in the automotive sector, photolithography, steppers, excimer lasers, wafers, computer chips and/or integrated circuits and electronic devices which contain such circuits and chips.

The invention furthermore relates to optical elements which comprise the glass according to the invention. Optical elements may in this case particularly be lenses, prisms, light guide rods, arrays, optical fibres, gradient components, optical windows and compact components. According to the invention, the term "optical element" also includes preforms of such an optical element, for example gobs, precision gobs and the like.

The invention furthermore relates to a method for producing an optical element, comprising the step of:

precise pressing an optical glass according to the invention.

The invention furthermore relates to a method of using such an element for producing optical parts or optical components, for example sensors, microscopy, medical technology, digital protection, telecommunication, optical communications engineering/information transmission, optics/lighting in the automotive sector, photolithography, steppers, excimer lasers, wafers, computer chips and/or integrated circuits and electronic devices which contain such circuits and chips.

The invention furthermore relates to optical parts or optical components, for example for imaging sensors, microscopy, medical technology, digital protection, telecommunication, optical communications engineering/information transmission, optics/lighting in the automotive sector, photolithography, steppers, excimer lasers, wafers, computer chips and/or integrated circuits and electronic devices which contain such circuits and chips.

The present invention will be explained in more detail below by examples according to the invention and comparative examples. However, the invention is in no way limited to the examples which are given.

EXAMPLES

Tables 2 and 3 contain 7 exemplary embodiments in the preferred composition range, as well as two comparative examples. The glasses described in the examples were produced as follows:

The raw materials for the oxides, preferably the corresponding carbonates, were weighed, one or more refining agents such as $Sb_2O_3$ were added and subsequently mixed well. The glass batch was melted at about 1250° C. in batch melting equipment, subsequently refined (1300° C.) and homogenized. At a casting temperature of about 1000° C., the glass was cast and worked to the desired dimensions. In large-volume continuous equipment, experience shows that the temperatures could be reduced by at least about 100 K and the material could be worked by the hot forming method close to final geometry, for example precision presses.

Table 1:

| Melting example of glass calculated for 100 kg: | | | |
|---|---|---|---|
| Oxide | wt. % | Raw material | Weigh-in (kg) |
| $SiO_2$ | 24.0 | $SiO_2$ | 24.03 |
| $B_2O_3$ | 7.0 | $H_3BO_3$ | 12.44 |
| $Al_2O_3$ | 1.5 | $Al(OH)_3$ | 2.40 |
| $Li_2O$ | 4.0 | $Li_2CO_3$ | 9.95 |
| $Na_2O$ | 6.0 | $Na_2CO_3$ | 10.25 |
| $K_2O$ | 4.0 | $K_2CO_3$ | 5.89 |
| CaO | 5.0 | $CaCO_3$ | 8.86 |
| BaO | 1.0 | $BaCO_3$ | 1.29 |
| SrO | 1.0 | $SrCO_3$ | 1.44 |
| ZnO | 6.0 | ZnO | 6.01 |
| $TiO_2$ | 0.5 | $TiO_2$ | 0.45 |
| $ZrO_2$ | 0.8 | $ZrO_2$ | 8.04 |
| $Nb_2O_5$ | 29.0 | $Nb_2O_5$ | 29.06 |
| $Ta_2O_5$ | 3.0 | $Ta_2O_5$ | 2.97 |
| Sum | 100.0 | | 123.08 |

The properties of the glass obtained in this way are specified in Table 2 as Example 2.

TABLE 2

| | Melt Examples (in wt. %) | | | | |
|---|---|---|---|---|---|
| | Examples | | | | |
| | 1 | 2 | 3 | 4 | 5 |
| $SiO_2$ | 24.0 | 28.0 | 34.0 | 40.0 | 32.0 |
| $B_2O_3$ | 7.0 | 6.0 | 4.0 | 5.5 | 7.0 |
| $Al_2O_3$ | 1.5 | | | | |
| $Li_2O$ | 4.0 | 3.0 | 1.0 | 6.0 | 5.0 |
| $Na_2O$ | 6.0 | 5.0 | 5.0 | 4.0 | 6.0 |
| $K_2O$ | 4.0 | 3.0 | 2.0 | 5.0 | 3.6 |
| MgO | | 0.9 | | | |
| CaO | 5.0 | 4.0 | 2.0 | 4.0 | 3.0 |
| BaO | 1.0 | 7.0 | 4.0 | 1.5 | 1.0 |
| SrO | 1.0 | 1.0 | | | |
| ZnO | 6.0 | 1.0 | 4.0 | 1.0 | |
| $TiO_2$ | 0.5 | 0.1 | 0.2 | 0.4 | 0.4 |
| $ZrO_2$ | 8.0 | 6.0 | 10.0 | 6.0 | 9.0 |
| $Nb_2O_5$ | 29.0 | 30.0 | 25.8 | 26.0 | 29.0 |
| $Ta_2O_5$ | 3.0 | 5.0 | 8.0 | 0.6 | 3.0 |
| $Sb_2O_3$ | | 0.2 | | | |
| Sum | 100.0 | 100.2 | 100.0 | 100.0 | 100.0 |
| $n_{d[7K/h]}$ | 1.7383 | 1.7436 | 1.7300 | 1.6788 | 1.7195 |
| $v_{d[7K/h]}$ | 33.94 | 33.81 | 32.95 | 38.64 | 34.73 |
| $P_{g,F[7K/h]}$ | 0.5844 | 0.5855 | 0.5879 | 0.5752 | 0.5831 |
| $\Delta P_{g,F}(10^{-4})_{[7K/h]}$ | -23 | -14 | -5 | -36 | -23 |
| $\tau_{i(25\,mm;420\,nm)}$ (%) | 85 | 85 | 74 | 91 | 91 |
| $\alpha_{20-300}(10^{-6} * K^{-1})$ | 9.8 | 8.9 | 6.7 | 9.3 | 9.5 |
| Tg (° C.) | 488 | 511 | 558 | 485 | 516 |
| $\rho$ (g/cm$^3$) | 3.36 | 3.45 | 3.43 | 3.04 | 3.20 |

TABLE 3

| | Melt Examples (in wt. %) | | | | |
|---|---|---|---|---|---|
| | Examples | | | | |
| | 6 | 7 | 8 | Comp Ex 1 | Comp Ex 2 |
| $SiO_2$ | 45.0 | 25.0 | 36.0 | 18.0 | 36.0 |
| $B_2O_3$ | 3.0 | 7.5 | 5.0 | 7.5 | 5.0 |
| $Al_2O_3$ | | 2.9 | | 2.9 | |
| $Li_2O$ | | | 2.0 | 3.0 | |
| $Na_2O$ | 8.0 | 10.0 | 2.0 | 10.0 | 2.0 |
| $K_2O$ | 6.0 | 8.0 | 2.5 | 9.0 | 1.5 |
| MgO | | | 0.5 | | 0.5 |
| CaO | 1.9 | 7.0 | 3.0 | 7.0 | 3.0 |
| BaO | 0.1 | 1.0 | 3.0 | 4.0 | 2.0 |
| SrO | 0.1 | | 1.0 | | |
| ZnO | 0.1 | 7.0 | 2.0 | 7.0 | 2.0 |
| $TiO_2$ | 0.3 | 0.1 | 1.0 | 0.1 | 1.0 |
| $ZrO_2$ | 7.0 | 6.0 | 8.0 | 6.0 | 9.0 |
| $Nb_2O_5$ | 28.0 | 25.0 | 29.0 | 25.0 | 32.0 |
| $Ta_2O_5$ | 0.5 | 0.5 | 5.0 | 0.5 | 6.0 |
| $Sb_2O_3$ | | 0.2 | | | |
| Sum | 100.0 | 100.2 | 100.0 | 100.0 | 100.0 |
| $n_{d[7K/h]}$ | 1.6610 | 1.6830 | 1.7241 | | |
| $v_{d[7K/h]}$ | 36.33 | 36.61 | 31.99 | | |
| $P_{g,F[7K/h]}$ | 0.5814 | 0.5792 | 0.5861 | | |
| $\Delta P_{g,F}(10^{-4})_{[7K/h]}$ | -13 | -30 | -11 | | |
| $\tau_{i(25\,mm;420\,nm)}$ (%) | 86 | 88 | 72 | | |
| $\alpha_{20-300}(10^{-6} * K^{-1})$ | 7.6 | 10.4 | 6.4 | 11.1 | 5.9 |

TABLE 3-continued

Melt Examples (in wt. %)

| | Examples | | | | |
|---|---|---|---|---|---|
| | 6 | 7 | 8 | Comp Ex 1 | Comp Ex 2 |
| Tg(° C.) | 633 | 531 | 563 | 527 | 587 |
| ρ(g/cm³) | 3.00 | 3.19 | 3.29 | 3.09 | 3.41 |

The comparative examples have a composition with which a transparent glass was not obtained, rather partial crystallization took place when cooling the composition so as to create glass ceramics. It was therefore not possible to determine the optical data.

The invention claimed is:

1. An optical glass having a composition, in percent by weight based on oxide content, of:

| | |
|---|---|
| $SiO_2$ | 19-45 |
| $B_2O_3$ | 3-7.5 |
| $Nb_2O_5$ | 25-31 |
| $K_2O$ | 2-8 |
| $TiO_2$ | 0.1-2 |
| $ZrO_2$ | 6-10 |
| $Ta_2O_5$ | 0.5-8. |

2. The optical glass as defined in claim 1, containing up to 5 wt. % of $Al_2O_3$.

3. The optical glass as defined in claim 1, containing up to 20 wt. % of a sum total amount of alkali metal oxides, up to 8 wt. % of $Li_2O$ and up to 10 wt. % of $Na_2O$.

4. The optical glass as defined in claim 1, containing from 2 to 4 wt. % of CaO.

5. The optical glass as defined in claim 1, containing up to 18 wt. % of a sum total amount of MgO, CaO, SrO, BaO and ZnO, and up to 8 wt. % of each of MgO, SrO, BaO and ZnO.

6. The optical glass as defined in claim 1, having the following composition, in percent by weight based on oxide content, of:

| | |
|---|---|
| $SiO_2$ | 28-36 |
| $B_2O_3$ | 5-7.5 |
| $Nb_2O_5$ | 26-29 |
| $Li_2O$ | 3-6 |
| $Na_2O$ | 5-8 |
| $K_2O$ | 2.5-4.5 |
| CaO | 2-4 |
| BaO | 0.1-2 |
| ZnO | 0.1-2 |
| $TiO_2$ | 0.1-0.45 |
| $ZrO_2$ | 7-9 |
| $Ta_2O_5$ | 0.5-6. |

7. The optical glass as defined in claim 1, containing up to 5 wt. % of a sum total of at least one component selected from the group consisting of F, $P_2O_5$, $Y_2O_3$, $Gd_2O_3$ $GeO_2$, $Yb_2O_5$ and $WO_3$.

8. The optical glass as defined in claim 1, containing, in weight percent on the basis of oxide content:

| | |
|---|---|
| $Sb_2O_3$ | 0-1 and/or |
| SnO | 0-1 and/or |
| NaCl | 0-1 and/or |
| $SO_4^{2-}$ | 0-1 and/or |
| $F^-$ | 0-1. |

9. The optical glass as defined in claim 1, having a refractive index $n_d$ of $1.60 \leq n_d \leq 1.80$ and/or an Abbe number $v_d$ of $30 \leq v_d \leq 40$.

10. An optical element comprising the optical glass as defined in claim 1.

11. The optical element as defined in claim 10, and consisting of a lens, a prism, a light guide rod, an array, an optical fiber, a gradient component or an optical window.

12. A method of making an optical element, said method comprising the step of precise pressing an optical glass as defined in claim 1.

13. An optical component for imaging, sensors, microscopy, medical technology, digital protection, telecommunications, optical communications engineering/information transmission, optics and lighting in the automotive sector, photolithography, steppers, excimer lasers, wafers, computer chips and/or integrated circuits, and electronic devices containing said circuits and said chips, said optical component comprising said optical element as defined in claim 10.

14. An optical glass having a composition, in percent by weight based on oxide content, of:

| | |
|---|---|
| $SiO_2$ | 19-45 |
| $B_2O_3$ | 3-7.5 |
| $Nb_2O_5$ | 25-31 |
| $K_2O$ | 2-8 |
| $TiO_2$ | 0.1-0.45 |
| $ZrO_2$ | 6-10 |
| $Ta_2O_5$ | 0.5-8. |

15. The optical glass as defined in claim 14, containing up to 5 wt. % of $Al_2O_3$.

16. The optical glass as defined in claim 14, containing up to 20 wt. % of a sum total amount of alkali metal oxides; up to 8 wt. % of $Li_2O$; and up to 10 wt. % of $Na_2O$.

17. The optical glass as defined in claim 14, containing from 1.9 to 4 wt. % of CaO.

18. The optical glass as defined in claim 14, containing up to 18 wt. % of a sum total amount of MgO, CaO, SrO, BaO and ZnO, and up to 8 wt. % of each of MgO, CaO, SrO, BaO and ZnO.

19. The optical glass as defined in claim 14, having the following composition, in percent by weight based on oxide content, of:

| | |
|---|---|
| $SiO_2$ | 28-36 |
| $B_2O_3$ | 5-7.5 |
| $Nb_2O_5$ | 26-29 |
| $Li_2O$ | 3-6 |
| $Na_2O$ | 5-8 |
| $K_2O$ | 2.5-4.5 |
| CaO | 2-4 |
| BaO | 0.1-2 |
| ZnO | 0.1-2 |
| $TiO_2$ | 0.1-0.45 |
| $ZrO_2$ | 7-9 |
| $Ta_2O_5$ | 0.5-6. |

20. The optical glass as defined in claim 14, containing up to 5 wt. % of a sum total of at least one component selected from the group consisting of F, $P_2O_5$, $Y_2O_3$, $Gd_2O_3$ $GeO_2$, $Yb_2O_5$ and $WO_3$.

21. The optical glass as defined in claim 14, containing, in weight percent on the basis of oxide content:

| | |
|---|---|
| $Sb_2O_3$ | 0-1 and/or |
| SnO | 0-1 and/or |
| NaCl | 0-1 and/or |
| $SO_4^{2-}$ | 0-1 and/or |
| $F^-$ | 0-1. |

22. The optical glass as defined in claim 14, having a refractive index $n_d$ of $1.60 \leq n_d \leq 1.80$ and/or an Abbe number $v_d$ of $30 \leq v_d \leq 40$.

23. An optical element comprising the optical glass as defined in claim 14.

24. The optical element as defined in claim 23, and consisting of a lens, a prism, a light guide rod, an array, an optical fiber, a gradient component or an optical window.

25. A method of making an optical element, said method comprising the step of precise pressing an optical glass as defined in claim 14.

26. An optical component for imaging, sensors, microscopy, medical technology, digital protection, telecommunications, optical communications engineering/information transmission, optics and lighting in the automotive sector, photolithography, steppers, excimer lasers, wafers, computer chips and/or integrated circuits, and electronic devices containing said circuits and said chips, said optical component comprising said optical element as defined in claim 23.

27. An optical glass having a composition, in percent by weight based on oxide content, of:

| | |
|---|---|
| $SiO_2$ | 19-45 |
| $B_2O_3$ | 3-7.5 |
| $Nb_2O_5$ | 25-31 |
| $K_2O$ | 2-8 |
| $Na_2O$ | 6-10 |
| $TiO_2$ | 0.1-2 |
| $ZrO_2$ | 6-10 |
| $Ta_2O_5$ | 0.5-8. |

28. The optical glass as defined in claim 27, containing up to 5 wt. % of $Al_2O_3$.

29. The optical glass as defined in claim 27, containing up to 20 wt. % of a sum total amount of alkali metal oxides and no more than 8 wt. % of $Li_2O$.

30. The optical glass as defined in claim 27, containing from 1.9 to 4 wt. % of CaO.

31. The optical glass as defined in claim 27, containing up to 18 wt. % of a sum total amount of MgO, CaO, SrO, BaO and ZnO, and up to 8 wt. % of each of MgO, CaO, SrO, BaO and ZnO.

32. The optical glass as defined in claim 27, having the following composition, in percent by weight based on oxide content, of:

| | |
|---|---|
| $SiO_2$ | 28-36 |
| $B_2O_3$ | 5-7.5 |
| $Nb_2O_5$ | 26-29 |
| $Li_2O$ | 3-6 |
| $Na_2O$ | 6-8 |
| $K_2O$ | 2.5-4.5 |
| CaO | 2-4 |
| BaO | 0.1-2 |
| ZnO | 0.1-2 |
| $TiO_2$ | 0.1-0.45 |
| $ZrO_2$ | 7-9 |
| $Ta_2O_5$ | 0.5-6. |

33. The optical glass as defined in claim 27, containing up to 5 wt. % of a sum total of at least one component selected from the group consisting of F, $P_2O_5$, $Y_2O_3$, $Gd_2O_3$ $GeO_2$, $Yb_2O_5$ and $WO_3$.

34. The optical glass as defined in claim 27, containing, in weight percent on the basis of oxide content:

| | |
|---|---|
| $Sb_2O_3$ | 0-1 And/or |
| SnO | 0-1 And/or |
| NaCl | 0-1 And/or |
| $SO_4^{2-}$ | 0-1 And/or |
| $F^-$ | 0-1. |

35. The optical glass as defined in claim 27, having a refractive index $n_d$ of $1.60 \leq n_d \leq 1.80$ and/or an Abbe number $v_d$ of $30 \leq v_d \leq 40$.

36. An optical element comprising the optical glass as defined in claim 27.

37. The optical element as defined in claim 36, and consisting of a lens, a prism, a light guide rod, an array, an optical fiber, a gradient component or an optical window.

38. A method of making an optical element, said method comprising the step of precise pressing an optical glass as defined in claim 27.

39. An optical component for imaging, sensors, microscopy, medical technology, digital protection, telecommunications, optical communications engineering/information transmission, optics and lighting in the automotive sector, photolithography, steppers, excimer lasers, wafers, computer chips and/or integrated circuits, and electronic devices containing said circuits and said chips, said optical component comprising said optical element as defined in claim 36.

* * * * *